Figure 1:
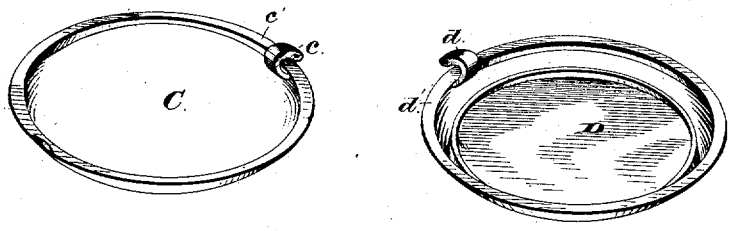

R. J. QUIGLEY.

JOINT FOR WATCH CASES.

No. 10,517. Reissued Aug. 26, 1884.

Witnesses:

Jas. E. Hutchinson.

Henry C. Hazard.

Inventor.

Robert J. Quigley, by

Lindley & Russell, his Attys

N. PETERS, Photo-Lithographer, Washington, D. C.

UNITED STATES PATENT OFFICE.

ROBERT J. QUIGLEY, OF TORONTO, ONTARIO, CANADA.

JOINT FOR WATCH-CASES.

SPECIFICATION forming part of Reissued Letters Patent No. 10,517, dated August 26, 1884.

Original No. 288,184, dated November 6, 1883. Application for reissue filed March 13, 1884. Patented in Canada August 23, 1883, No. 17,543.

*To all whom it may concern:*

Be it known that I, ROBERT JOHN QUIGLEY, of the city of Toronto, in the county of York, Province of Ontario, Canada, did invent certain new and useful Improvements in Joints for Watch-Cases, for which Letters Patent No. 288,184 were issued to me upon the 6th day of November, 1883, which Letters Patent have been found defective, in that they do not fully cover the said improvements as set forth in the specification, and shown in the drawings, which were filed by me in the Patent Office upon the 9th day of August, 1883, preparatory to the obtaining of a patent therefor. Now, therefore, being desirous of reissuing the said Letters Patent herewith surrendered, I have prepared, and do hereby declare that the following is a full, clear, and exact description of the said improvements, reference being had to the accompanying drawings, making a part of this specification, in which—

Figure 2:
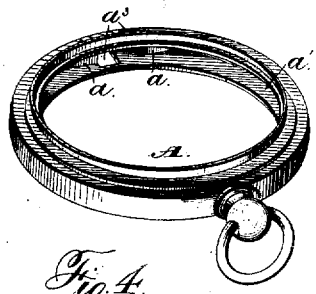
Figure 3:
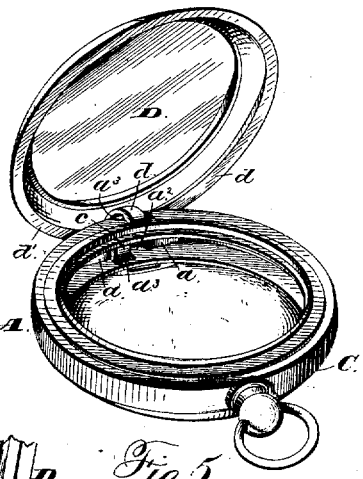
Figure 4:
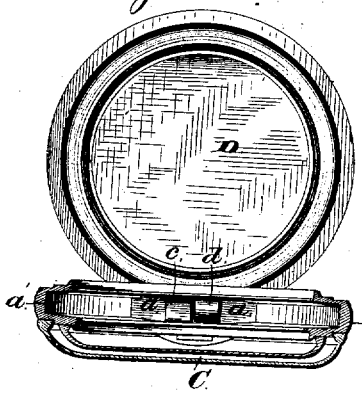
Figure 5:
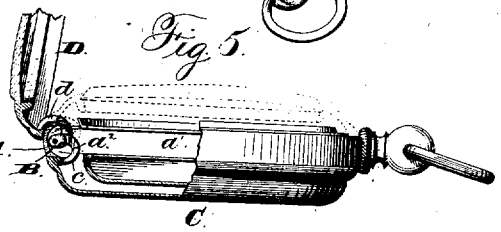

Figure 1 is a perspective view of the back and bezel separated from the case-center. Fig. 2 is a like view of the case-center. Fig. 3 is a perspective view of said parts united for use. Fig. 4 is a section upon a line passing through the center of the case and intersecting the hinges, and Fig. 5 is a cross-section upon line *x x* of Fig. 3.

Letters of like name and kind refer to like parts in each of the figures.

The design of my invention is to enable the hinged portions of a watch-case to be connected to or with the center in a strong, efficient, and durable manner, without affording opportunity for the admission of dust or dirt to the interior of the case through or at such points of connection, to which end said invention consists, principally, in a watch-case having its outer hinged parts connected with the case-center by joints which are wholly within the case and within the bearing of each part on said center, substantially as and for the purpose hereinafter specified.

It consists, further, in a watch-case in which the outer hinged parts are connected with the case-center by means of joints that are entirely within the case, and are not visible when the same is closed, substantially as and for the purpose hereinafter shown.

It consists, further, in a watch-case in which both of its outer hinged parts are pivoted upon one pin within the recessed interior of the case-center, substantially as and for the purpose hereinafter set forth.

It consists, further, in a watch-case in which each of its outer hinged parts is pivoted upon a pin within the recessed interior of the case-center by means of a curved lug that is connected to said hinged part at a point within the line of its bearing upon said center, substantially as and for the purpose hereinafter shown and described.

It consists, further, in a watch-case in which each of the outer hinged parts is connected to the case-center by means of a lug pivoted on a pin at a point radially outside of or beyond a line drawn perpendicular to the hinged part from the point of attachment of the lug thereto, substantially as and for the purpose hereinafter described.

It consists, further, in a watch-case in which each of its outer hinged parts is connected with the case-center by means of a curved lug that is pivoted within the recessed interior of said center at a point radially outside of or beyond a line drawn through the point of attachment of the lug to the hinged part, perpendicular to such part, substantially as and for the purpose hereinafter described.

It consists, further, in a watch-case in which each of its outer hinged parts is connected with the case-center by means of a lug that is pivoted upon a pin within the recessed interior of said center, and from thence extends in a curve to and is secured upon said hinged part at a point inside of the bearing-face of the same, substantially as and for the purpose hereinafter set forth.

It consists, further, in a watch-case in which a pin inserted within the case-center operates as a bearing for and upon which are pivoted the hinged parts that form the opposite sides of said case, substantially as and for the purpose hereinafter shown and described.

It consists, finally, in a watch-case in which the pin that forms the pivotal bearing for the hinged parts has its ends contained within bearing-blocks that are secured within the recessed interior of the case-center, substantially as and for the purpose hereinafter specified.

In carrying into effect my invention, two blocks, *a*, are secured within the recess *a'* of a case-center, A, at a predetermined distance from each other, and through the same and the adjacent portion of said center is inserted a pin, B, which has a right angle to the radius thereof, and is parallel with the plane of the same. Said blocks give to the ends of said pin all necessary support, while the central portion of the latter, which extends across the space $a^2$, between the inner ends of the former, is left clear for use as a pivotal or hinge bearing. An opening, $a^3$, having a width equal to one-half the length of the space or recess $a^2$, is formed within each side of said case-center, directly over said recess, and completes the portion of the hinge mechanism belonging thereto. The back C or bezel D are constructed and fitted to the center A in the usual manner, and are each provided with a lug, *c* or *d*, which is secured to the inner face at a point just inside of the bearing-edge *c'* or *d'* of said part, and from thence extends in a curve forward, downward, and outward, and terminates at a point slightly farther from the axial center of said back or bezel than is its said point of attachment thereto. The lug *c* or *d* is inserted within one of the openings $a^3$, and its outer end journaled upon the pin B, in which position it acts as a pivotal connection between the part to which it is attached, C or D, and the case-center A, and permits said part to be opened and closed in the usual manner. The curvature of each hinge-lug is such as to enable it to readily pass longitudinally through the opening $a^3$ as the part to which it is attached is opened or closed, while in consequence of the arrangement of the pivotal end of said lug outside, radially, of its point of attachment to the bezel or back, said part, as it opens, is raised from off the case-center and caused to swing clear of the same, as shown in Fig. 4. Said hinge-lugs *c* and *d* are both pivoted upon the pin B, which thus performs an office that has heretofore required the use of two hinge-pins. The hinge-connections thus formed leave the exterior of the case entirely free from the unsightly protuberances heretofore required, and being entirely inside of said case, in no manner afford opportunity for the admission thereto of dust and dirt.

It will be obvious that in applying this invention to hunting-cases the front and back, instead of the back and bezel, will be connected with the center by my hinge.

Having thus fully set forth the nature and merits of my invention, what I claim as new is—

1. A watch-case having its outer hinged part connected with the case-center by a joint which is wholly within the case and within the bearing of said part on said center, substantially as and for the purpose specified.

2. A watch-case in which the outer hinged parts are connected with the case-center by means of joints that are entirely within the case, and are not visible when the same is closed, substantially as and for the purpose shown.

3. A watch-case in which both of its outer hinged parts are pivoted upon one pin within the recessed interior of the case-center, substantially as and for the purpose set forth.

4. A watch-case in which each of its outer hinged parts is pivoted upon a pin within the recessed interior of the case-center by means of a curved lug that is connected to said hinged part at a point within the line of its bearing upon said center, substantially as and for the purpose shown and described.

5. A watch-case in which each of the outer hinged parts is connected to the case-center by means of a lug pivoted on a pin at a point radially outside of or beyond a line drawn perpendicular to the hinged part from the point of attachment of the lug thereto, substantially as and for the purpose described.

6. A watch-case in which each of its outer hinged parts is connected with the case-center by means of a curved lug that is pivoted within the recessed interior of said center at a point radially outside of or beyond a line drawn through the point of attachment of the lug to the hinged part, perpendicular to such part, substantially as and for the purpose described.

7. A watch-case in which each of its outer hinged parts is connected with the case-center by means of a lug that is pivoted upon a pin within the recessed interior of said center, and from thence extends in a curve to and is secured upon said hinged part at a point inside of the bearing-face of the same, substantially as and for the purpose set forth.

8. A watch-case in which a pin inserted within the case-center operates as a bearing for and upon which are pivoted the hinged parts that form the opposite sides of said case, substantially as and for the purpose shown and described.

9. A watch-case in which the pin that forms the pivotal bearing for the hinged parts has its ends contained within bearing-blocks that are secured within the recessed interior of the case-center, substantially as and for the purpose specified.

In testimony that I claim the foregoing I have hereunto set my hand this 8th day of March, A. D. 1884.

R. J. QUIGLEY.

Witnesses:
GEO. S. PRINDLE,
PHILIP G. RUSSELL.